(12) United States Patent
Chen

(10) Patent No.: US 7,044,274 B2
(45) Date of Patent: May 16, 2006

(54) BICYCLE FRONT SUSPENSION DEVICE

(76) Inventor: Hui-Hsiung Chen, No. 34, Chia-Hou Rd, Liu-Feng Tsuen, Waipu Hsiang, Taichung Hsien (TW)

( * ) Notice: Subject to any disclaimer, the term of this patent is extended or adjusted under 35 U.S.C. 154(b) by 57 days.

(21) Appl. No.: 10/962,419

(22) Filed: Oct. 13, 2004

(65) Prior Publication Data
US 2006/0076201 A1   Apr. 13, 2006

(51) Int. Cl.
*F16F 9/34* (2006.01)
(52) U.S. Cl. ............... 188/319.2; 188/285; 188/310; 188/299.1
(58) Field of Classification Search ............ 188/319.2, 188/278, 285, 310, 299.1, 322.16, 275, 266.5, 188/305, 300; 280/276, 283, 284
See application file for complete search history.

(56) References Cited

U.S. PATENT DOCUMENTS 5,320,375 A * 6/1994 Reeves et al. ............. 280/284
5,505,281 A * 4/1996 Lee ......................... 188/299.1

* cited by examiner

*Primary Examiner*—Xuan Lan Nguyen
(74) *Attorney, Agent, or Firm*—Rosenberg, Klein & Lee

(57) ABSTRACT

A suspension device includes a cap connected to a seal member on the inner tube of the front fork. A cable has one end fixed to a rod and the other end extends through the cap and is connected to a switching device on the handlebar. The rod has an end section which is connected to a frame and the frame is fixed to the suspension device. The rod is lifted by operating the switching device to pull the cable so as to set the suspension device at a locked status.

6 Claims, 8 Drawing Sheets

BICYCLE FRONT SUSPENSION DEVICE

FIELD OF THE INVENTION

The present invention relates to a bicycle front suspension device which is controlled by a cable to adjust the suspension device to various damping stages.

BACKGROUND OF THE INVENTION

A conventional bicycle front suspension device 80 is disclosed in FIG. 6A and is controlled by a cable 81 which is connected to a switching device attached on handlebar of the bicycle. The cable 81 is wrapped around to a cap 82 which is connected with a torsion spring 821 so as to return the cap 82 to its original position, a shaft 85 is fixed to the cap 82. A tube 84 is received in the steeter tube which is movably inserted in a front fork and the handlebar is fixed to a top of the steerer tube. A first through hole 841 is defined through a wall of the tube 84. A seal member 83 is inserted in a top end of the steerer tube and the tube 84 extends through the seal member 83. The shaft 85 is rotatably received in the tube 84 and includes a second through hole 851 which is rotated to an open position where the first and second through holes 841, 851 are in communication with each other. Hydraulic oil is received in the steerer tube and when the suspension device 80 is set to an operative status, the shaft 85 is rotated to the open position such that the hydraulic oil enters the second through hole 851 and flows out from the first through hole 841 to allow the relative movement of the steerer tube and the front fork. As shown in FIG. 6B, when the user wants to lock the front suspension device 80, he or she simply pulls the cable 81 to rotate the cap 82 and the shaft 85 to rotate the second through hole 851 from the first through hole 841. The hydraulic oil then cannot flows through the two through holes 841, 851 so that there will be no relative movement between the steerer tube and the front fork. It is experienced that it requires a lot of force to rotate the shaft 85, especially for the limited diameter of the cap 82 which generates only a short arm of force to rotate the shaft 85.

The present invention intends to provide a bicycle front suspension device which is optionally adjustable in various damping stages and includes a simple structure and can be positioned to match with different types of brake systems and orientation of the cable.

SUMMARY OF THE INVENTION

The present invention relates to a suspension device that comprises a seal member and a rod extends through the seal member. The seal member has a flange extending from an outer periphery of the seal member so as to be rested on a top of an inner tube of a front fork. A threaded outer periphery is defined in the seal member so as to be threadedly fixed to the inner tube. A cap is connected to the open top of the seal member and has a protrusion and a cable extends through the protrusion and enters the seal member. A tubular portion extends from the cap and a plurality of radial blocks extend from an outer periphery of the tubular portion such that the tubular portion is securely engaged with the seal member. A rod includes is connected to the cable and has an end section at a lower end thereof which is fixed to a frame. The frame has a base portion and a protrusion extends from a top of the base portion. The end section of the rod is connected to the protrusion and the base portion is connected to the suspension device. A spring is mounted to the protrusion and biased between the base portion and a washer.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
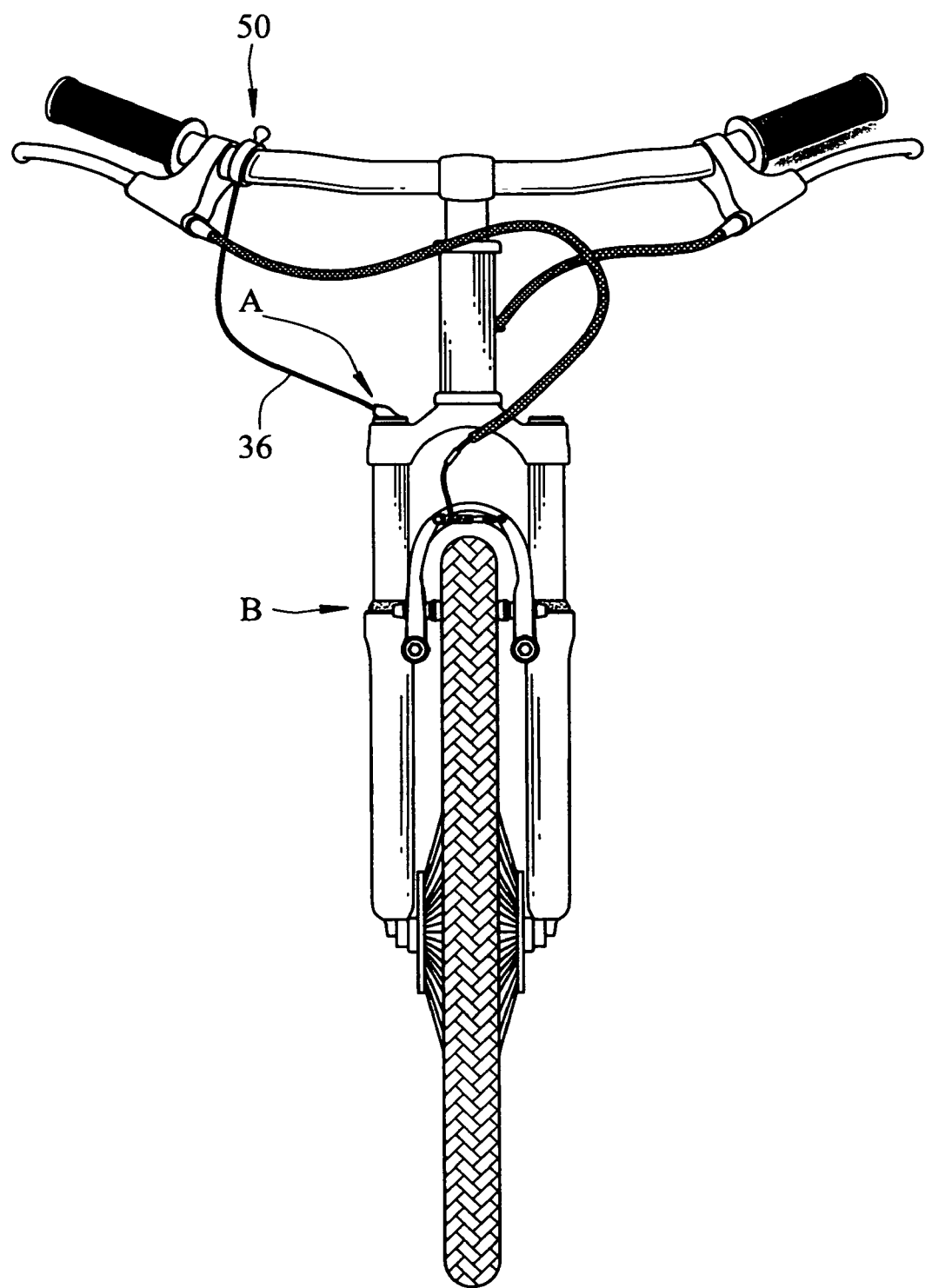
FIG. 1 shows the suspension device of the present invention on a bicycle.
Figure 2:
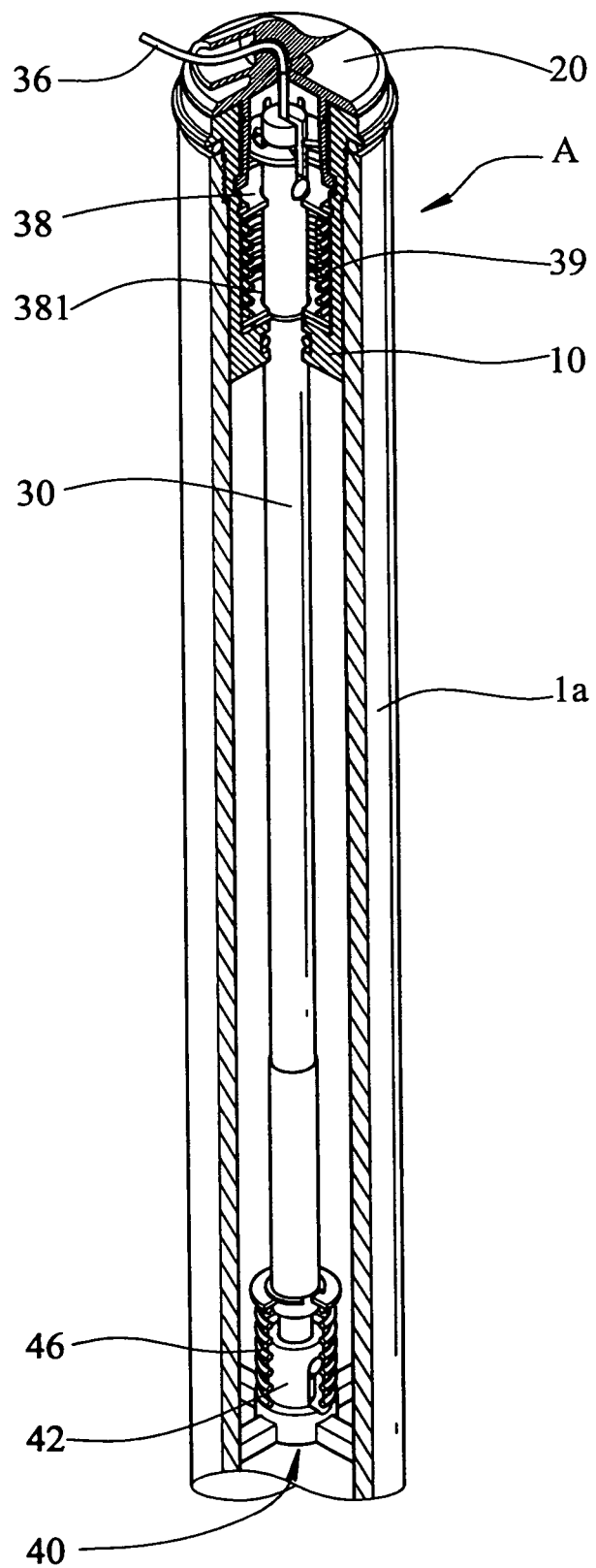
FIG. 2 shows the suspension device, partly removed, of the present invention.
Figure 3:
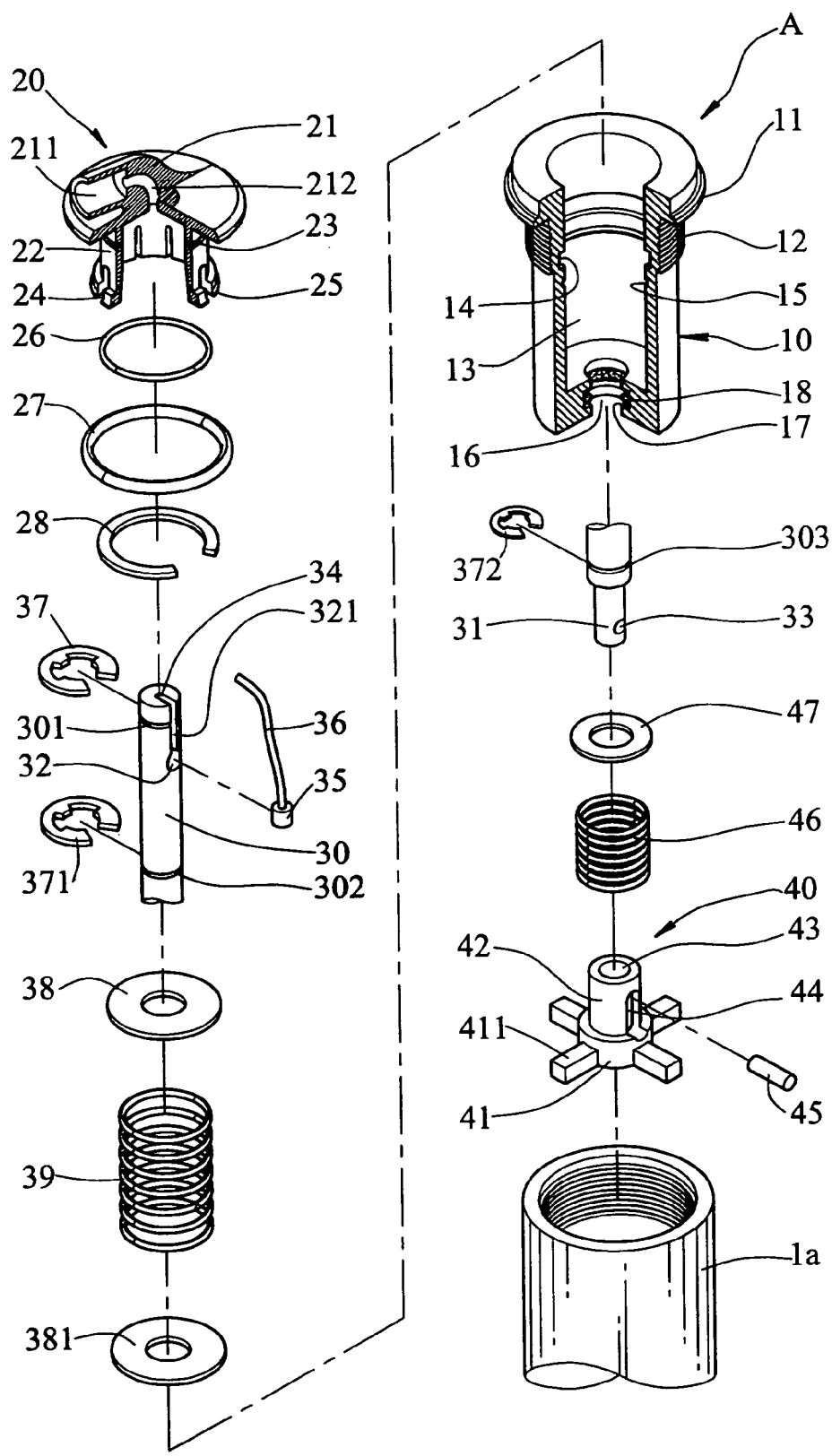
FIG. 3 is an exploded view to show the suspension device of the present invention.
Figure 4A:
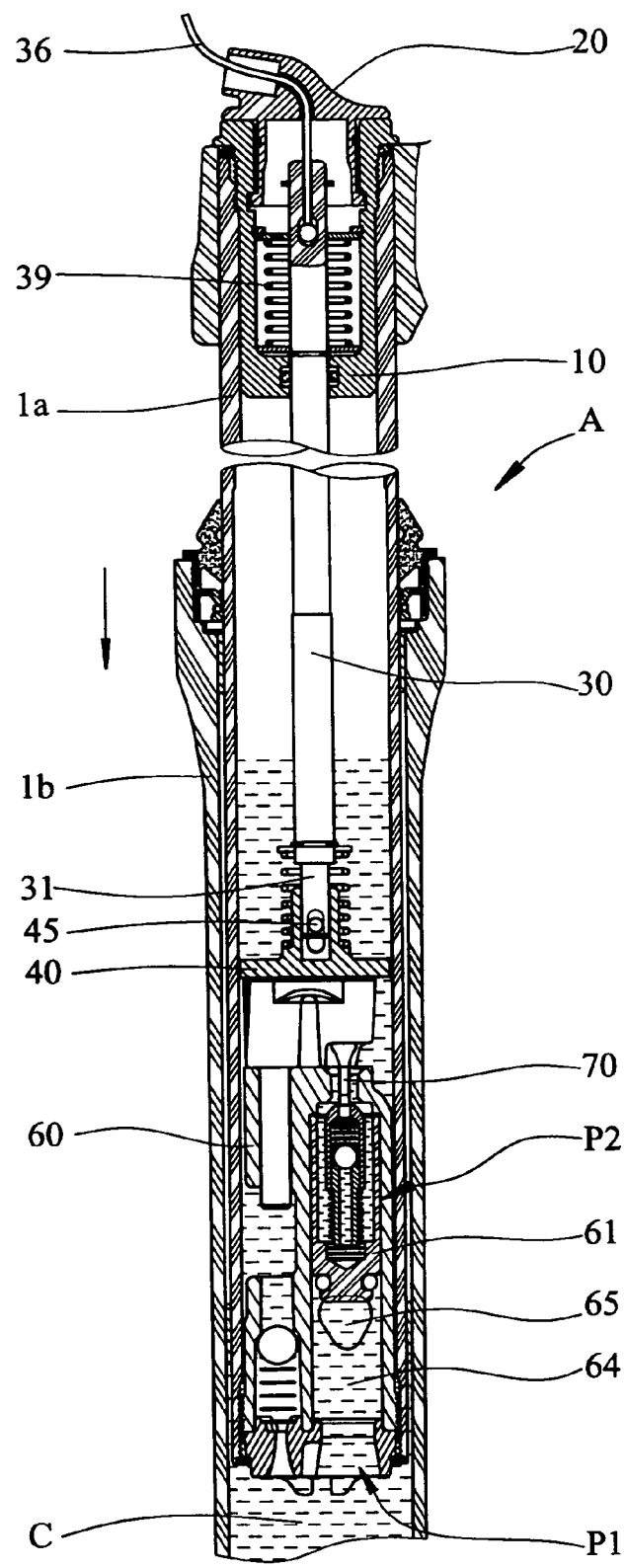
FIG. 4A shows the suspension device wherein the inner tube is moved toward the outer tube.
Figure 4B:
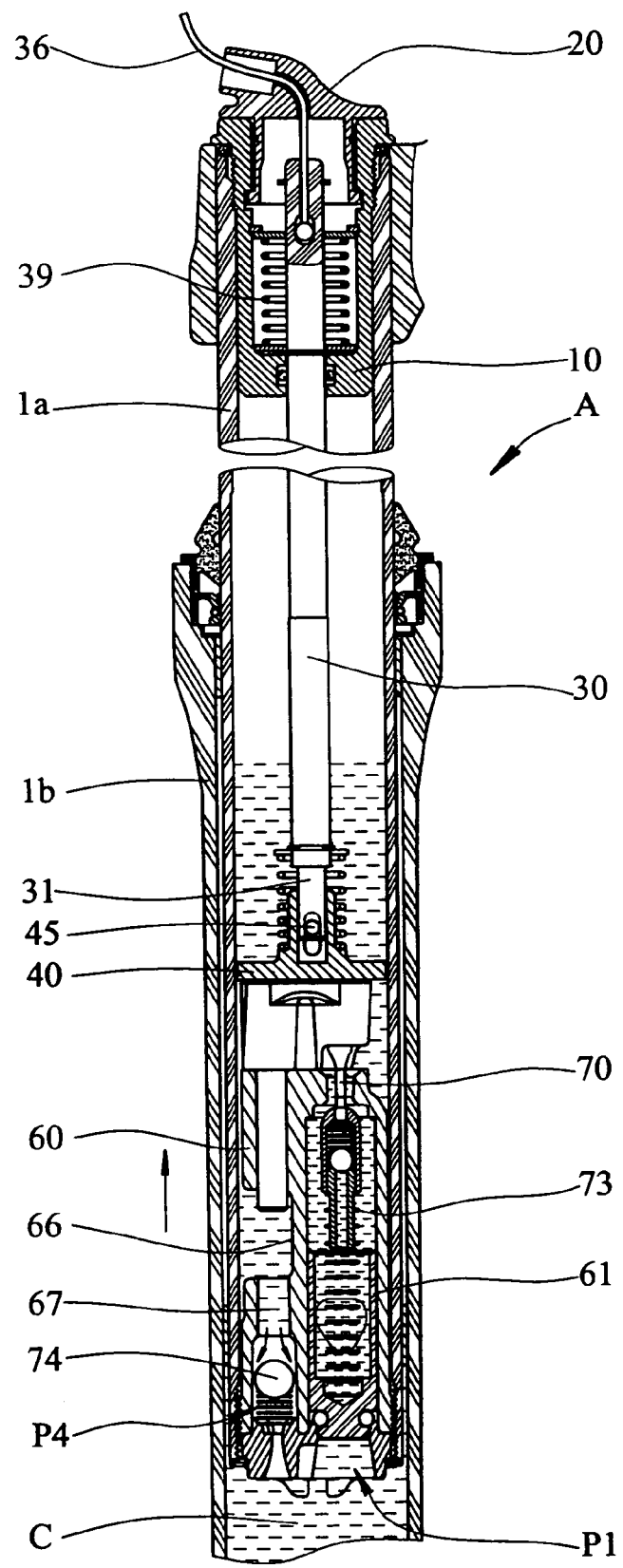
FIG. 4B shows the suspension device wherein the inner tube is moved toward the outer tube.

Referring to FIGS. 1 to 3, the front suspension device "B" of the present invention comprises a control device "A" comprising a seal member 10, a cap 20, a rod 30 and a frame 40. A cable 36 is connected to a switching device 50 on the handlebar of the bicycle. Referring to FIG. 4A, the front fork includes an inner tube 1a and an outer tube 1b, hydraulic oil "C" is filled in the front fork and the suspension device "B" is located in the inner tube 1a and includes a main part 60, a plurality of seal members, a plurality springs and a control member 70. When the inner tube 1a is moved into the outer tube 1b, the hydraulic oil "C" located beneath the main part 60 forces the first seal member 61 move upward to a first open position "P2". In this position, the first seal member 61 no longer seals the through hole 65 such that the hydraulic oil "C" enters the opening 64 and the through hole 65 and flows toward the main part 60. When the inner tube 1a is moved away from the outer tube 1b as shown in FIG. 4B, the hydraulic oil "C" above the main part 60 enters the opening 64 and the first seal member 61 moves back to its original position by the spring 73, such that the first seal member 61 moves to the first block position "P1". In the meanwhile, most of the hydraulic oil "C" enters the outlet 67 from the neck portion 66 and pushes the bead 74 to the third open position "P4". By this way, the hydraulic oil "C" flows downward to the space located below the main part 60. The suspension feature is achieved by the relative movement of the inner tube 1a and the outer tube 1b.

The suspension device "B" includes a seal member 10 and a first grove 14 and a second groove 15 are defined in an inner periphery of an open top thereof. A bottom hole 16 is defined through a bottom of the seal member 10 so that the rod 30 extends therethrough. An annular space 17 is defined in an inner periphery of the bottom hole 16. The seal member 10 includes a flange 11 on an outer periphery thereof which is rested on the top of the inner tube 1a and a threaded outer periphery 12 is defined in the seal member 10 so as to be threadedly fixed the inner tube 1a. An O-ring 27 is mounted to the seal member 10 so as to seal the threaded connection portion of the seal member 10 and the inner tube 1a.

The cap 20 includes a protrusion 21 in which a chamber 211 and a passage 212 are defined, the cable 36 extends through the passage 212 and the chamber 211. A tubular portion 22 extends from the cap 20 and a plurality of elongate slots 24 defined in and opening to a lower periphery of the tubular portion 22. A plurality of radial blocks 25 extend from the outer periphery of the tubular portion 22 such that the tubular portion 22 is securely engaged with an open top of the seal member 10 and the blocks 25 are engaged with the first groove 14 in the seal member 10. An engaging groove 23 is defined in an outer periphery of the tubular portion 22 and an O-ring 26 is engaged with the groove 23.

The rod 30 includes an end section 31 at a lower end thereof and a first hole 32 is defined through the rod 30 and a second hole 33 is defined through the end section 31. A cable hole 34 is defined in a top of the rod 30 and communicates with the first hole 32. A slot 321 is defined in an outer periphery of the rod 30 and located in communication between the cable hole 34 and the first hole 32 such that a head 35 of the cable 36 is engaged with the first hole 32 and the cable 36 is inserted in the slot 321 and extends through the cable hole 34.

The frame 40 includes a base portion 41 with a flat bottom and four legs 411 extend outward from the base portion 41. A protrusion 42 extends from a top of the base portion 41 and includes a recess 43 for receiving the end section 31 of the rod 30. A side hole 43 is defined through a wall of the protrusion 42 and a pin 45 extends through the side hole 43 and the second hole 33 to position the end section 31. The base portion 41 is connected to the suspension device "B".

A spring 46 is mounted to the protrusion 42 and is biased between the base portion 41 and the washer 47 which is secured by using a C-shaped clip 372 engaged with a groove 303 defined in the rod 30. An O-ring 18 is engaged with the annular space 17 in the seal member 10 and the rod 30 extends through the bottom hole 16, the O-ring 18. A washer 381, a spring 39 and another washer 38 are respectively mounted to the rod 30 in the chamber 13 in the seal member 10. A C-shaped clip 371 is engaged with a groove 302 of the rod 30 and located beneath the washer 38. Another C-shaped clip 28 is engaged with the second groove 15 of the seal member 10 and yet another C-shaped clip 37 is engaged with the groove 301 in the rod 30 to position the cable 36 to the rod 30.

Figure 5:
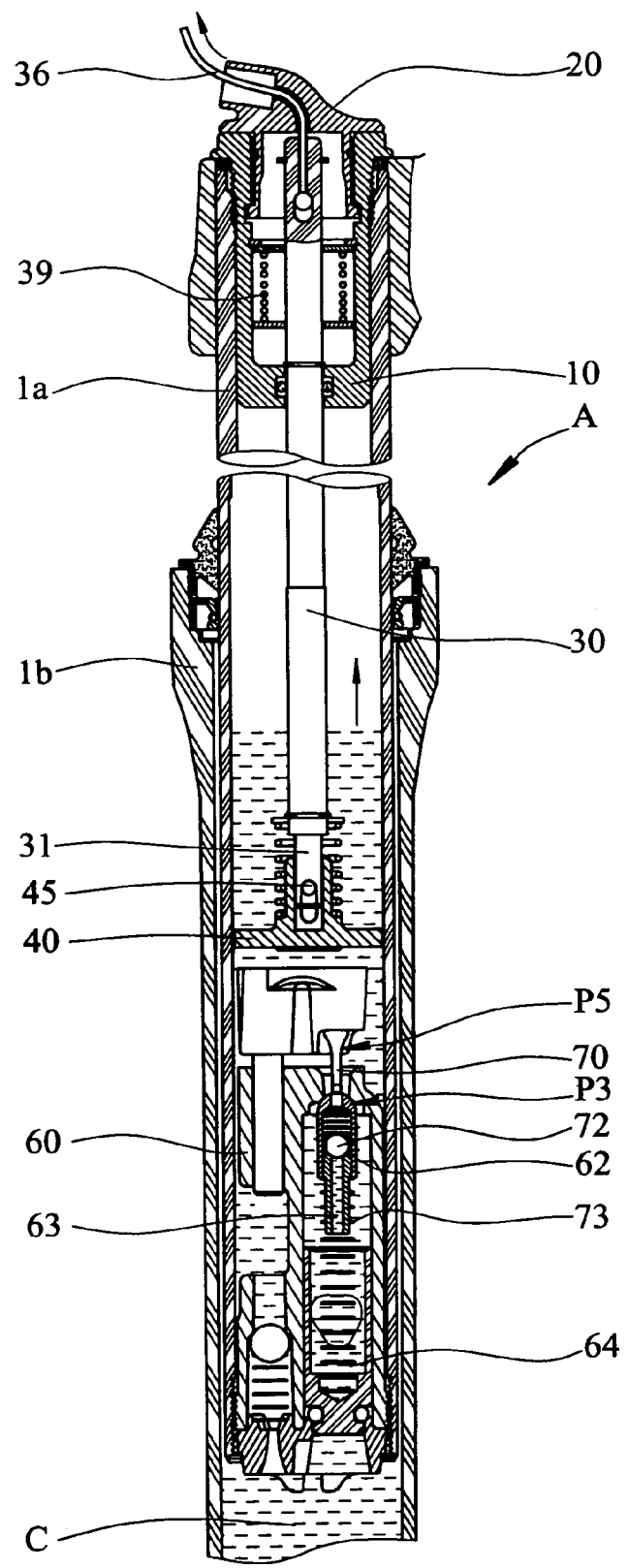
FIG. 5 shows that the suspension device of the present invention is in locked status.
Figure 6A:
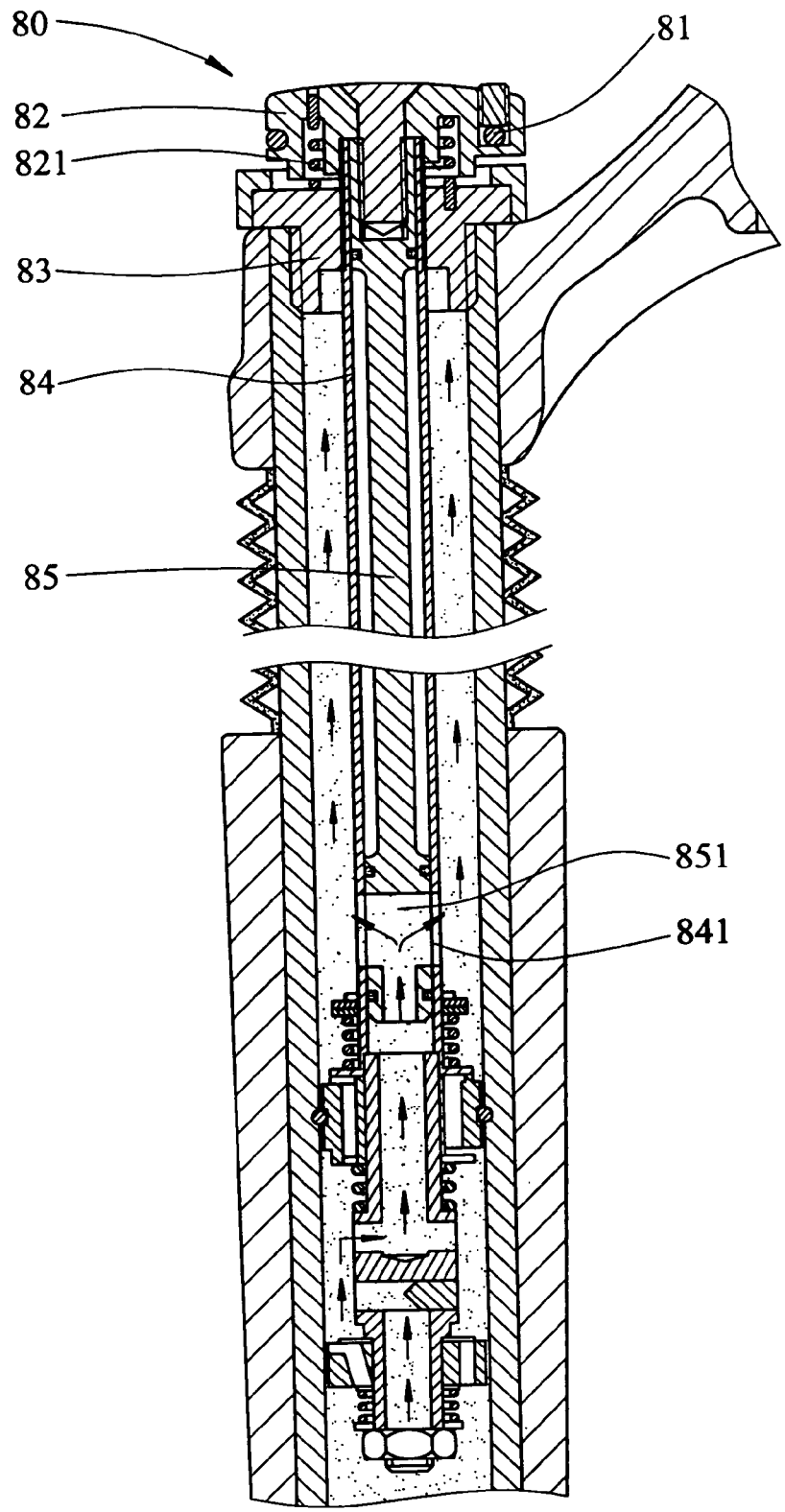
FIG. 6A shows a conventional suspension device.
Figure 6B:
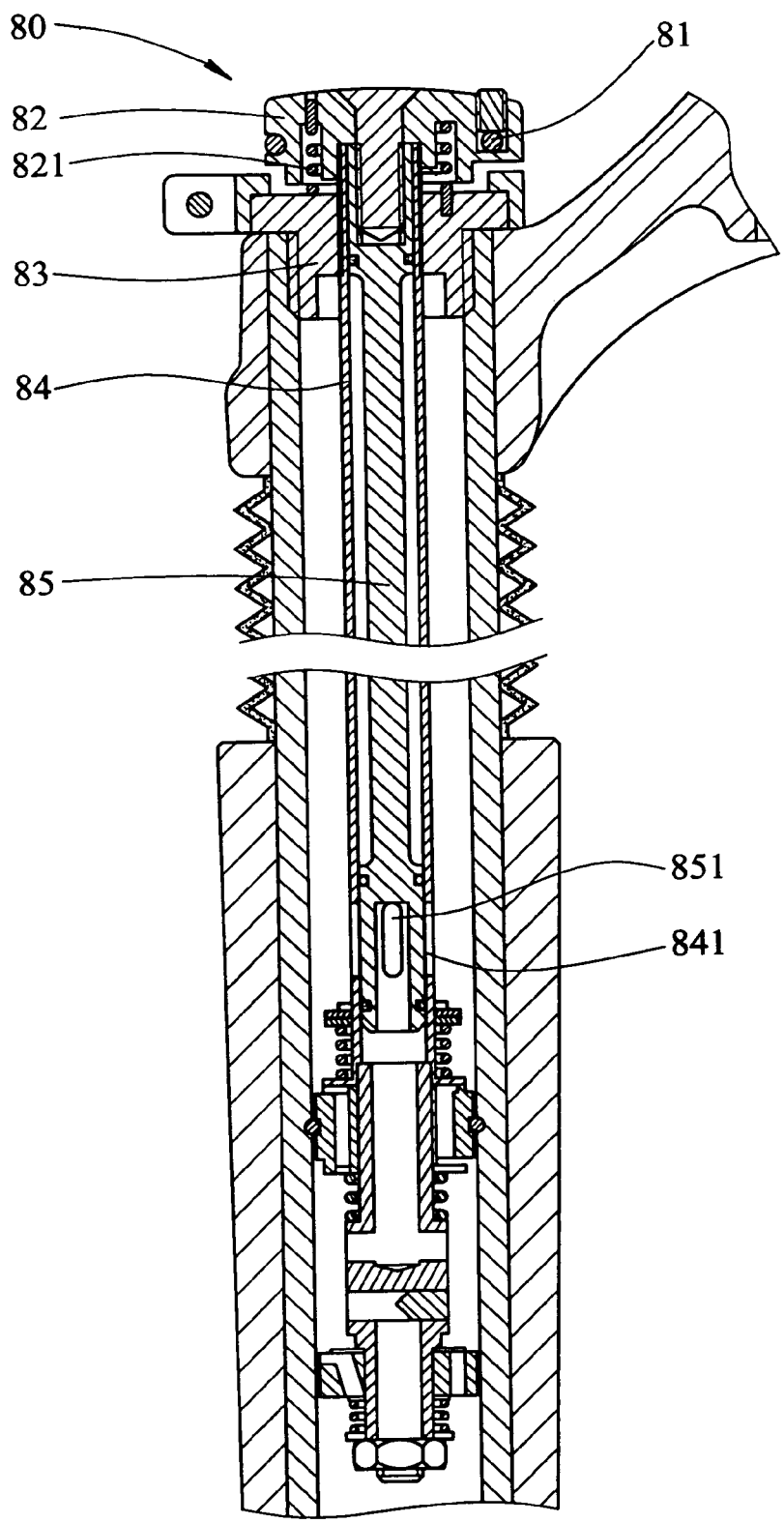
FIG. 6b shows that the conventional suspension device is locked.

As shown in FIG. 5, by pulling the cable 36 to lift the rod 30, the frame 40 is lifted to a position and the rod 30 is positioned at a block position "P5". The second seal member 62 is pushed to the second block position "P3" by the spring 73 and seals the opening 64. The bead 72 is biased by the spring 71 and seals the opening 63. The hydraulic oil "C" in the opening 64 cannot flow to anywhere and the hydraulic oil are separated by the main part 60 such that the suspension device "B" does not work and is in a locked status. The locked status is unlocked by operating the switching device 50 and the rod 30 and the frame 40 return to their original positions.

While we have shown and described the embodiment in accordance with the present invention, it should be clear to those skilled in the art that further embodiments may be made without departing from the scope of the present invention.

What is claimed is:

1. A suspension device comprising:

a seal member (10) having an open top and a bottom hole (16) defined through a bottom of the seal member (10), a rod (30) extending through the bottom hole (16), a flange (11) extending from an outer periphery of the seal member (10) and adapted to be rested on a top of an inner tube of a front fork, a threaded outer periphery (12) defined in the seal member (10) so as to be adapted to be threadedly fixed to the inner tube (1a);

a cap (20) having a protrusion (21) and a cable (36) extending through the protrusion (21) and entering the seal member (10), a tubular portion (22) extending from the cap (20) and a plurality of radial blocks (25) extending from an outer periphery of the tubular portion (22) such that the tubular portion (22) is securely engaged with the seal member (10);

the rod (30) including an end section (31) at a lower end thereof and a first hole (32) defined through the rod (30) and a second hole (33) defined through the end section (31), the cable (36) fixed to the rod (30);

a frame (40) having a base portion (41) and a protrusion (42) extending from a top of the base portion (41), the end section (31) of the rod (30) connected to the protrusion (42) and the base portion (41) adapted to be connected to the suspension device (B); and a spring (46) mounted to the protrusion (42) and biased between the base portion (41) and a washer (47) secured by a C-shaped clip (372) engaged with a groove (303) defined in the rod (30).

2. The device as claimed in claim 1, wherein a side hole (43) is defined through a wall of the protrusion (42) and a pin (45) extends through the side hole (43) and the second hole (33) to position the end section (31).

3. The device as claimed in claim 1, wherein the seal member (10) has a first grove (14) and a second groove (15) are defined in an inner periphery of an open top thereof, the blocks (25) of the cap (20) are engaged with the first groove (14) in the seal member (10).

4. The device as claimed in claim 1, wherein the tubular portion (22) includes a plurality of elongate slots (24) defined in and opening to a lower periphery of the tubular portion (22).

5. The device as claimed in claim 1, wherein the rod (30) includes a cable hole (34) defined in a top thereof and the cable hole (34) communicates with the first hole (32), a slot (321) defined in an outer periphery of the rod (30) and located in communication between the cable hole (34) and the first hole (32), a head (35) of the cable (36) is engaged with the first hole (32) and the cable (36) is inserted in the slot (321) and extends through the cable hole (34).

6. The device as claimed in claim 1, wherein the base portion (41) of the frame (40) includes four legs (411) extending outward therefrom the base portion (41) so as to be adapted to be connected to the suspension device (B), the protrusion (42) on the base portion (41) includes a recess (43) for receiving the end section (31) of the rod (30).

* * * * *